United States Patent [19]

Scarpellino et al.

[11] 4,378,380
[45] Mar. 29, 1983

[54] METHOD FOR PRODUCING PRODUCTS ENHANCED WITH SYNTHETIC COFFEE GRINDER GAS FLAVOR

[75] Inventors: Richard J. Scarpellino, Ramsey; Ellen Danielczik, Fort Lee, both of N.J.; Charles L. Teitelbaum, Jamaica, N.Y.

[73] Assignee: General Foods Corporation, White Plains, N.Y.

[21] Appl. No.: 353,261

[22] Filed: Mar. 1, 1982

Related U.S. Application Data

[63] Continuation-in-part of Ser. No. 195,913, Oct. 10, 1980, abandoned, which is a continuation of Ser. No. 15,988, Feb. 28, 1979, abandoned, which is a continuation of Ser. No. 906,811, May 17, 1978, abandoned.

[51] Int. Cl.³ .............................................. A23L 1/234
[52] U.S. Cl. .................................... 426/533; 426/534; 426/594
[58] Field of Search ........................ 426/533, 534, 594

[56] References Cited

U.S. PATENT DOCUMENTS 1,696,419 12/1928 Staudinger et al. .................. 426/534
3,852,481 12/1974 Feldman et al. ..................... 426/533
3,973,049 8/1976 Furda .................................. 426/533
4,009,291 2/1977 Mitchell et al. ................. 426/658 X
4,041,185 8/1977 Parliment ............................ 426/534
4,076,852 2/1978 Delft et al. .......................... 426/533

OTHER PUBLICATIONS

Aretander, Perfume and Flavor Chemicals, vol. I, 1969, publ. by the Author; Montclair, N.J., Item No. 1417.
Furia et al., Fenaroli's Handbook of Flavor Ingredients, 2nd Ed., 1975, CRC Press: Cleveland, p. 211.

Primary Examiner—Joseph M. Golian
Attorney, Agent, or Firm—Thomas R. Savoie; Thomas A. Marcoux; Daniel J. Donovan

[57] ABSTRACT

Known coffee flavor compounds including methyl mercaptan, a molar excess of carbonyl compounds and furfuryl mercaptan are combined in an aqueous solution of an inert, water-soluble carbohydrate at a preferred level of less than about 3% and then promptly dried, such as by spray-drying. These compounds may be fixed either separately or together. The dried fixed enhancer material is then combined with soluble coffee solids and/or soluble coffee-like solids powdered foodstuffs.

14 Claims, No Drawings

METHOD FOR PRODUCING PRODUCTS ENHANCED WITH SYNTHETIC COFFEE GRINDER GAS FLAVOR

This application is a continuation-in-part of Ser. No. 195,913 filed Oct. 10, 1980 which application was in turn a continuation of Ser. No. 15,988, filed Feb. 28, 1979, which was a continuation of Ser. No. 906,811, filed May 17, 1978, all of which are now abandoned.

BACKGROUND OF THE INVENTION

The present invention relates to the preparation of powdered coffee-flavored foodstuffs as well as soluble coffee powders, soluble coffee-like powders and combinations thereof which, when reconstituted, possess the flavor and/or aroma characteristics of roasted and ground coffee. According to this invention the term, "powdered coffee-flavored foodstuff" is meant to include products which are not regarded as coffee substitutes and are designed to be dissolved in a hot or cold aqueous fluid such as milk or water to produce a coffee-flavored food or beverage. Typical coffee-flavored food powders included powder creamers, powdered soft drink mixes, powdered pudding mixes and powdered gelatin dessert mixes. The term "soluble coffee-like powders" is meant to include those products which are useful as soluble coffee substitutes and which are comprised of soluble coffee solids obtained from roasted vegetable material such as chicory, wheat, barley, chickpeas and others known to those skilled in the art. More particularly this invention relates to a synthetic coffee grinder gas aroma which is an improvement over the grinder gas aroma disclosed in commonly-assigned U.S. Pat. No. 3,852,481 to Feldman et al. This invention is also concerned with methods of fixing coffee flavor and aroma enhancers as well as combining the fixed enhancers with a powdered foodstuff, a soluble coffee powder and/or a soluble coffee-like powder.

According to the aforementioned Feldman et al. patent, which is hereby incorporated by reference, a synthetic grinder gas aroma is produced by combining methyl mercaptan along with certain aldehydes and ketones and then combining this aroma mixture with an edible carrier such as coffee oil or with soluble coffee. The synthetic grinder gas aroma produced according to the Feldman et al. patent constituted a significant advance in the art of soluble coffee enhancement; however, the Feldman aroma has been considered lacking in certain aroma flavor notes, most notably a roasted note, which are found in natural grinder gas aroma.

SUMMARY OF THE INVENTION

The present invention relates to a composition which will provide a coffee grinder gas aroma comparable to that of natural coffee grinder gas and including a desirable roasted note. This invention also relates to a technique for fixing the new composition in a manner which avoids significant deterioration of desirable flavor notes and in a manner which permits the fixed composition to be combined with soluble coffee or coffee-like powders, a powdered foodstuffs to which it is desired to add or enhance a coffee flavor.

According to this invention, methyl mercaptan is contacted with a mole excess of a mixture of carbonyl compounds including acetaldehyde, a four or five carbon alkane aldehyde and a lower alkane α-diketone and with furfuryl mercaptan. It has been found that any desirable interactions which take place between and among the respective carbonyl and mercaptan compounds are relatively rapid so that it would be possible to either combine the compounds together before fixing or to fix one or more of these compounds separately from the other end and then combine the fixed materials. In this latter embodiment, the interactions between the separately fixed compounds would occur as the soluble product to which they are added is reconstituted immediately before consumption. As set forth in the Feldman et al. patent, the methyl mercaptan combines with the preceding carbonyl compounds to produce a desirable grinder gas aroma; however, unexpectedly in view of the teachings of Feldman et al., the present invention has found it desirable to add a relatively high level furfuryl mercaptan to add a desirable roasted note to the composition without causing any immediate undesirable interactions and without adding a foul smell, commonly described as rubber boot for furfuryl mercaptan. *Fenaroli's Handbook of Flavor Ingredients* 2nd Edition (Chemical Rubber Co. 1975) at Vol. 2, Pg. 209, notes the potential for furfuryl mercaptan to exhibit an unpleasant odor.

Desirably the unreacted and unfixed furfuryl mercaptan should not be permitted to remain in liquid state contact with the methyl mercaptan or carbonyl compounds for a prolonged period of time, especially if these compounds are present at a relatively concentrated level. Thus, when furfuryl mercaptan is combined with the other synthetic grinder gas components in a liquid state, conversion of the liquid mixture to a dry form should take place before the passage of several hours, preferably within two hours. It would, of course, be possible to fix furfuryl mercaptan in dry form, usually at levels below 1% by weight, away from the methyl mercaptan and carbonyl components.

It has been found that the preferred fixatives for use in this invention are water-soluble, hydrolyzed starch materials, such as low D.E. (dextrose equivalent) dextrins and corn syrup solids and that the aroma components can only be fixed at a relatively low level of below 10%, preferably below about 3% and typically between about 1% to 3% by weight of the fixative. Attempts to fix in dextrinlike materials at higher levels result in fixations which quickly dissipate a high percentage of aromatics. Efforts to employ fixatives consisting solely of materials such as gelatin or other materials which contain reactive groups, such as atmospheric coffee solids, or the solids extracted from a caramelized mixture of roasted wheat, bran and molasses (Postum ®), have not proven as successful. It is believed that the reactive nature of the carbonyl and/or mercaptan compounds limits the choice of fixatives. Use of autoclave coffee solids, which consist essentially of high molecular weight compounds and low D.E. dextrins in combination with minor (less than 25%) amount of gums, such as gum arabic, may be employed.

DETAILED DESCRIPTION OF THE INVENTION

The aroma composition of this invention is prepared by contacting a molar excess of carbonyl compounds with methyl mercaptan, the molar ratio being in the range of from 3:1 to 90:1 and preferably within the range of 20:1 to 50:1, and including in the composition an amount of furfuryl mercaptan at a weight ratio to methyl mercaptan of from 1:4 to 2:1. The aforementioned carbonyl compounds must include acetaldehyde, preferably at a mole ratio to methyl mercaptan of from 2:1 to 50:1, a 4 or 5 carbon alkane aldehyde, preferably at a mole ratio to methyl mercaptan of from 0.02:1 to 3:1, and a lower alkane α-diketone, preferably at a mole ratio to methyl mercaptan of from 0.2:1 to 5:1.

The preferred alkane aldehyde is isobutyraldehyde; however, isovaleraldehyde may be employed in place of or in addition to the isobutyraldehyde. The preferred alkane α-diketones are 2,3-butanedione and 2,3-pentanedione. While mixtures of these diketones may be employed, it is preferred to employ a single diketone, particularly 2,3-butanedione. Desirably the aroma composition will also contain an amount of acetone, preferably at a mole ratio to methyl mercaptan of from 0.6:1 to 30:1. Other additives such as dimethyl sulfide may also be added to the synthetic grinder gas composition.

As mentioned previously, the synthetic grinder gas compounds are fixed in an inert fixative. As previously noted, all of these compounds may be fixed together or furfuryl mercaptan may be fixed away from the methyl mercaptan. The furfuryl mercaptan which has a boiling point of 155° C. and is insoluble in water may be separately fixed at a level below about 1% by weight, usually in combination with other higher-boiling enhancers. Typically the synthetic grinder gas fixation is accomplished by preparing a water solution of a dextrin fixative, such as a low D.E. (10 or less) hydrolyzed starch material exemplified by 10 D.E. Frodex (acid hydrolyzed corn syrup solids produced by American Maize Corp.) and 10 D.E. Mor-Rex (enzymatically hydrolyzed starch produced by CPC International Corp.), adding the grinder gas compounds at a level of from 1 to 3% by weight of the fixative to the water solution and then drying, such as by freeze-drying or spray drying. In commercial operation, generally it will be desirable to spray dry, preferably from a solution having a solids concentration of from 30 to 45% by weight. Spray drying should be effected at relatively low temperatures so as to minimize loss of volatiles. Inlet air temperature to the spray dryer should be from about 125° C. to 290° C; air outlet temperature should be from 85° C. to 100° C.

In order to facilitate addition of the synthetic grinder gas compounds to the aqueous fixative solution, it is possible to dissolve the highly volatile compounds such as methyl mercaptan (B.P. 6° C.) in an edible organic solvent such as an alcohol which can to a great extent be removed during the drying step or in propylene glycol or triacetin which at the levels employed will not impart a detectable flavor to the end product. Likewise water-insoluble compounds such as furfuryl mercaptan can be first dissolved in an edible organic solvent prior to addition to the aqueous fixative solution.

Other known coffee enhancers such as the woody-flavored 2-nonenal and 2-nonenol compounds of U.S. Pat. No. 3,886,297 and the green earthy-flavored substituted pyrazine compounds of U.S. Pat. No. 3,767,425 may also be added to the soluble coffee or coffee-like products in order to increase their consumer appeal. It has been found, however, that these high-boiling compounds (boiling point above about 180° C.) should be handled apart from the low-boiling point compounds of the synthetic grinder gas formulation. These high-boiling compounds, optionally in combination with furfuryl mercaptan, will be added at low levels to a separate water solution of an edible fixative and then spray or freeze dried. The total amount of these enhancers to be fixed should again preferably be less than 3% by weight of the fixative.

The fixed synthetic grinder gas compounds, together with other fixed enhancers, are combined with soluble foodstuff powders, soluble cofee and/or soluble coffee-like solids at the appropriate level in order to effect the desired aroma/flavor impact. Advantageously, the soluble foodstuff, coffee and coffee-like particles will be sized coparably to the fixed enhancers so that segregation of the particles will not occur in the final product. It would also be possible to co-agglomerate the various dry components. It has been found that the volatile compounds fixed at the low level specified in this invention are able to pass through a mild stream agglomeration step without significant loss of volatiles. The steam employed for agglomeration should preferably be saturated and have a temperature below about 135° C., typically about 120° C.

For purposes of this invention, the fixed furfuryl mercaptan is added to the soluble coffee-flavored foodstuff, coffee or coffee-like product at a level which will produce a furfuryl mercaptan concentration in the final product, as consumed, of from 20 to 80 parts per billion, preferably about 25 to 50 parts per billion. Since typically a soluble beverage powder is reconstituted to a beverage having a 1% by weight soluble solids level, the furfuryl mercaptan concentration in a beverage powder should be about 2 to 8 parts per million.

EXAMPLE 1

A 40% soluble solids aqueous solution of a 10 D.E. dextrin (Mor-Rex) was prepared to which a synthetic grinder gas formulation was added in order to produce a solution within the following compositional ranges. Methyl mercaptan was added to the dextrin solution by first dissolving methyl mercaptan in triacetin and then adding amounts of this triacetin solution containing the desired quantity of methyl mercaptan. The solution was spray dried in a co-current spray drier having an air inlet temperature of 130° C. and an air outlet temperature of 95° C.

| Ingredient | Wt. % |
|---|---|
| Mor-Rex (10 D.E.) | 94–98 |
| Acetaldehyde | 0.4–3.0 |
| Acetone | 0.1–2.0 |
| Methyl Mercaptan | .04–0.2 |
| Dimethyl Sulfide | .03–1.5 |
| Isobuteraldehyde | .04–1.5 |
| Isovaleraldehyde | .04–1.0 |
| 2,3-Butanedione | 0.1–2.0 |

A second 40% dextrin solution was prepared to which was added furfuryl mercaptan, dissolved in triacetin, 2-nonenol, 2-isobutyl-3-methoxypyrazine and eugenol. The resulting solution having the following compositional ranges is spray dried under the same conditions recited above.

| Ingredient | Wt. % |
|---|---|
| Mor-Rex (10 D.E.) | 94–98 |
| Furfuryl Mercaptan | .02–0.1 |
| 2-Nonenol | .06–0.4 |
| 2-Isobutyl-3-Methoxy pyrazine | .0004–.002 |
| Eugenol | 0.3–1.0 |

The two spray dried powders are blended together in equal amounts and agglomerated with spray dried coffee solids at a weight ratio of 5% fixed enhancers and 95% coffee. The agglomeration step is effected in a tower agglomerator fed with saturated steam at 121° C. and drying air having an inlet temperature of 143° C. and an outlet temperature of 93° C. The resulting coffee product is packaged in glass jars under an inert atmosphere. After several weeks of storage and upon the initial and subsequent openings of the jars, a pleasant coffee grinder gas aroma is apparent and upon dissolving the agglomerated powder in hot water, a coffee beverage having an improved taste and aroma over conventional soluble coffees is obtained.

EXAMPLE 2

The procedure of Example 1 was followed with the exception that the furfuryl mercaptan component was added to the dextrin solution containing the methyl mercaptan. In operation, separate solutions of methyl mercaptin dissolved in triacetin and furfuryl mercaptan dissolved in triacetin were added to the first dextrin solution and this solution also containing the other synthetic coffee grinder gas components was spray dried within two hours of being prepared to produce a fixed synthetic grinder gas material. The second dextrin solution containing the 2-nonenol, 2-isobutyl-3-methoxypyrazine and engenol components was spray dried as in Example 1 to produce a fixed synthetic coffee enhancer material. These two spray dried materials were agglomerated with soluble coffee solids as in Example 1 to produce a coffee product and coffee beverage which, upon being evaluated after several weeks storage, is comparable to the product and beverage of Example 1.

EXAMPLE 3

Fifty-six grams of a commercial vanilla instant pudding mix is combined with 3 grams of agglomerated soluble coffee powder from Example 2. The combined mix was added to a bowl containing 250 ml of cold milk and mixed until well blended and then allowed to set for several minutes. The pudding possesses a pleasant coffee flavor.

EXAMPLE 4

A coffee-flavored instant pudding mix is prepared by combining an unflavored instant pudding mix (51.5 grams), caramel color (1 gram), fixed synthetic coffee grinder gas material of Example 2 (0.1 grams) and fixed synthetic coffee enhancer material of Example 2 (0.06 grams). The combined mix is added to 250 ml of cold milk to produce a pudding as in Example 3. The pudding possess a pleasant coffee flavor.

EXAMPLE 5

A coffee-flavored beverage mix is prepared by combining a commercial non-dairy creamer powder (20 grams), powdered sugar (10 grams), caramel color (1 gram), fixed synthetic coffee enhancer material of Example 2 (0.48 grams), fixed synthetic coffee grinder gas material of Example 2 (0.18 grams), caffine (0.1 grams), disodium pyrophosphate (0.2 grams) and tetrasodium phosphate (0.2 grams). This mixture was dissolved in 715 ml of hot water to produce a pleasant coffee-flavored hot beverage.

EXAMPLE 6

A powdered coffee-flavored, non-dairy creamer is prepared by combined 20.3 grams of a commercial non-dairy creamer powder, 20.3 grams of sugar, 0.3 grams of the fixed synthetic coffee grinder gas material of Example 2 and 0.25 grams of the fixed synthetic coffee enhancer material of Example 2. The mix is added to one liter of hot coffee to produce a lightened coffee beverage having an excellent coffee flavor.

EXAMPLE 7

A coffee-flavored grain beverage mixed is prepared by combining 24 grams of instant Postum ®, a dried extract of roasted bran, wheat, and molasses, 0.4 grams of the the fixed synthetic coffee grinder gas material of Example 2 and 0.3 grams of the fixed synthetic coffee enhancer material of Example 2. This mix is added to one liter of hot water to produce a hot beverage having an excellent coffee flavor.

What is claimed:

1. A method for preparing a soluble, enhanced coffee-flavored foodstuff, coffee and/or coffee-like product comprising the steps of:
   (a) adding methyl mercaptan and a molar excess of carbonyl compounds, including for each mole of methyl mercaptan 2 to 50 moles of acetaldehyde, 0.02 to 3 moles of a 4 to 5 carbon alkane aldehyde and 0.2 to 5 moles of a lower alkane α-diketone selected from the group consisting of 2,3-butanedione, 2,3-pentanedione and mixtures thereof, to an aqueous solution of a non-reactive fixative, said materials being added in a total amount less than 10% by weight of the fixative,
   (b) drying the solution from step(a),
   (c) adding furfuryl mercaptan to an aqueous solution of a non-reactive fixative at a level below about 1% by weight of the fixative,
   (d) drying the solution of step (c),
   (e) combining the dried materials from steps (b) and (d) with soluble particles of a powdered foodstuff, coffee and/or coffee-like material, such that furfuryl mercaptan is present in an amount of from 2 to 8 parts per million by weight of the combined material and also present in an amount of from 1:4 to 2:1 by weight of methyl mercaptan.

2. The method of claim 1 wherein the weight of materials added in step (a) in less than 3% by weight of the fixative.

3. The method of claim 2 wherein the drying in steps (b) and (d) is effected by low-temperature spray drying.

4. The method of claims 2 or 3 wherein the dry combination of step (e) is agglomerated by means of saturated steam having a temperature below 135° C.

5. The method of claim 3 wherein one or more coffee enhancers having a boiling point in excess of 180° C. are added to the solution of step (c) at a level such that the total amount of enhancers fixed is less than 3% by weight of the fixative.

6. The method of claim 5 wherein 2-nonenol or 2-nonenal is added to the solution of step (c).

7. The method of claim 1 wherein the fixative of steps (a) and (c) is a hydrolyzed starch material having a dextrose equivalent of 10 or less.

8. A method for preparing a soluble, enhanced coffee-flavored foodstuff, coffee and/or coffee-like product comprising the steps of:

(a) adding methyl mercaptan, a molar excess of carbonyl compounds, including for each mole of methyl mercaptan 2 to 50 moles of acetaldehyde, 0.02 to 3 moles of a 4 to 5 carbon alkane aldehyde and 0.2 to 5 moles of a lower alkane α-diketone selected from the group consisting of 2,3-butanedione, 2,3-pentanedione and mixtures thereof, and furfural mercaptan in an amount of from 1:4 to 2:1 by weight of methyl mercaptan to an aqueous solution of a non-reactive fixation said materials being added in a total amount less than 10% by weight of the fixative.

(b) drying the solution from step (a), (c) combining the said material from step (b) with soluble particles of a powdered foodstuff, a coffee and/or a coffee-like material such that furfuryl mercaptan is present in an amount of from 2 to 8 parts per million by weight of the combined material.

9. The method of claim 8 wherein the weight of materials added to step (a) is less than 3% by weight of the fixative.

10. The method of claims 8 or 9 wherein one or more coffee enhancers having a boiling point in excess of 180° C. are added to an aqueous solution of a non-reactive fixative at a level such that the total amount of enhancer fixed is less than 3% by weight of the fixation, said solution is dried and the dried material combined with the dry powdered foodstuff, soluble coffee or coffee-like material of step (c).

11. The method of claim 10 wherein 2-nonenol or 2-nonenal is added as a coffee enhancer having a boiling point about 180° C.

12. A method of claim 8 wherein the fixation is a hydrolyzed starch material having a dextrose equivalent of 10 or less.

13. The method of claim 8 wherein the drying is effected by low-temperature spray drying.

14. The method of claim 10 wherein the combined materials are is agglomerated by means of saturated steam having a temperature below 135° C.

* * * * *